United States Patent Office
3,775,351
Patented Nov. 27, 1973

3,775,351
PRODUCTION OF POLYMER-INORGANIC FOAM
Carrol C. Sachs, 9938 Clybourn Ave.,
Sunland, Calif. 91352
No Drawing. Filed Oct. 28, 1970, Ser. No. 84,943
Int. Cl. C08d 13/08; C08f 47/08
U.S. Cl. 260—2.5 L                    21 Claims

ABSTRACT OF THE DISCLOSURE

Production of polymer-inorganic hybrid foam construction materials, by a process which comprises whipping air into a resin emulsion, such as a polyvinyl acetate emulsion, establishing a pre-foam or resin emulsion bubbles, adding an inorganic phase, which can be for example portland cement or gypsum, or a combination thereof, in the form of particles so as to suspend such inorganic particles on the foam bubbles without precipitating out such particles, pouring the resulting polymer-inorganic hybrid foam into suitable molds, permitting such foam to set to a solid self-supporting mass, usually taking place in a short period of the order of about 10 to about 30 minutes, and hardening the inorganic phase to fully set the hybrid foam, and form a hard rigid polymer-inorganic hybrid foam which is load supporting, for resistant, thermally insulating, and of low density. Such hybrid foam which is strong and lightweight, is particularly useful for production of wall, floor or roof panels in construction of buildings and homes.

---

This invention relates to production of novel high strength and low density construction materials, particularly designed for formation into panels and other structural shapes for general construction purposes, and is particularly concerned with procedure for producing a polymer-inorganic hybrid foam construction material, which in addition to being strong and lightweight, is load supporting, fire resistant, and thermally insulating, and having particular utility for the construction of wall, floor and roof panels, both for commercial and residential construction, and to the resulting hybrid foam products.

There has developed in recent years particularly for use in residential construction as well as in commercial building construction a need for new construction materials especially suitable for use in the form of large panels for wall, floor and roof construction, which have good strength characteristics, comparable to panels formed from cement or gypsum, but which are of much lower density so as to permit, for example, prefabrication of building constructions at a factory site, and transporting of such prefabricated structures to the building site. In addition, the construction materials or panels are required to have good thermal insulation and high fire resistance, and particularly such construction materials are required to be produced at reduced costs compared to comparable dense cement and gypsum panels, with their high labor demand, presently employed.

Pat. 3,437,619 is directed to preparation of polyester cementitious compositions which comprises making a mixture of polyester resin, unsaturated monomer such as styrene and portland cement, together with polymerization initiator such as sulfite, such mixture being made by stirring, followed by addition of water, with stirring to render the mixture reactive to initiate polymerization of the resin components and to hydrate the cement.

Pat. 3,390,109 discloses the use of resin dispersions in cement products.

Pat. 2,733,995 is directed to coating compositions or paints suitable for dispersion in water and containing water dispersible polyvinyl acetate and a hydraulic cement.

Pat. 3,104,234 is directed to spray drying a film forming vinyl acetate resin emulsion to produce a powder which can be redispersed in water, from which a film can be formed.

However, to applicant's knowledge none of the prior art including the above patents teaches the production of a polymer-inorganic hybrid foam construction in accordance with the novel procedure of the invention described below, nor the resulting foam construction materials which have the desirable properties and characteristics noted above.

Briefly, the process of the invention comprises providing an aqueous resin emulsion capable of being air whipped, whipping air into the resin emulsion and establishing a pre-foam of polymer or resin emulsion bubbles capable of supporting particles of an inorganic phase in the surface of said bubbles, adding an inorganic phase selected from the group consisting of cement and gypsum, in the form of particles gradually to said air whipped resin emulsion and suspending said inorganic particles in said pre-foam, that is in the walls of said bubbles, without precipitating out said particles, and hardening said inorganic phase to set the resulting hybrid foam of inorganic particles and resin, and form a solid polymer-inorganic hybrid foam of low density, and which is load supporting, fire resistant and thermally insulating.

As contrasted to the prior art of forming a resin-cement or resin-concrete mix and then simply stirring same, as exemplified by above Pat. 3,437,619, according to the process of the present invention, air is whipped into the resin emulsion prior to addition of any cement thereto. The cement or gypsum particles then gradually added to the whipped foam tend to deposit and remain in the bubble walls of the resin foam which enhances the stabilization of the foam. This is a salient feature of the invention necessary to obtain the strong lightweight homogeneous foam product of the invention, which feature is not disclosed or taught by the prior art.

A further feature of the present invention is that when employing cement according to this invention, only cement powder is used, and no sand is present, such sand being present in cement grout, and also no rock or aggregate is incorporated in the cement employed in making the foam.

A still further feature of the invention is that fiber glass roving can be introduced into the polymer-cement or polymer-gypsum hybrid foams of the invention, to reinforce such hybrid foams, and such reinforced foams can be stored over long periods of time without any evidence of fiber degradation. This permits the use of such fiber glass roving reinforcement having lightweight characteristics in the invention foam.

As previously noted, a basic feature of the invention process is the establishment of the polymer-emulsion system into a pre-foam, preferably of known or predetermined composition and density, such foam consisting of thick-walled resin emulsion bubbles capable of supporting large amounts of the inorganic phase, e.g., portland cement or gypsum powders, which are subsequently vibrated onto the surface of the foam and thoroughly mixed therewith.

To achieve such pre-foam, air is whipped into any type of resinous emulsion which is capable of being air whipped, and which is capable when so air whipped to maintain the inorganic phase particles in suspension therein. By the term "whipping air" or "air whipped" as employed herein is meant rapidly agitating the resin emulsion in the presence of air or while forcing or bubbling air into the mixture. Thus, the aqueous resin emulsion can be agitated in a tank open to the ambient atmosphere, or the resin emulsion can be agitated, with compressed air simultaneously forced or bubbled through the resin emulsion, e.g., as in a high shear single pass continuous mixer.

Of a large number of resin emulsions tested, it has been found that polyvinyl acetate emulsions are particularly suitable. Other aqueous emulsion polymer systems found satisfactory are vinyl-acrylic copolymer such as vinyl acetate-acrylic and vinyl chloride-acrylic copolymers, acrylic homopolymer, butadiene-styrene and silicone resins. Also, mixtures of the above polymers or resins in aqueous emulsions also can be employed. These polymers or resins are present in the aqueous emulsions usually in the fully polymerized state. However, where such resins are in the partially polymerized or B-stage, curing agents, polymerization initiators, and the like, well known in the art, can be added just prior to use, to effect final cure of the resin during the subsequent setting of the inorganic phase, e.g., cement.

Although the above exemplary resin emulsions are thermoplastic resin emulsions, thermosetting resin emulsions such as phenolic, e.g., phenol-formaldehyde, urea, e.g., ureaformaldehyde, and melamine, e.g., melamine-formaldehyde resin emulsions can be employed. Also, thermoplastic resins which are cross-linked in situ by X-ray or radioactive radiation, or thermally with peroxides added, can be employed.

Additionally auxiliary components can also be incorporated into the aqueous resin emulsion to enhance the properties thereof, for example, viscosity stabilizers, such as xanthate gums, accelerators such as triethanolamine, thickeners such as methyl cellulose, carboxy methyl cellulose, and the like. Where the most preferred aqueous polyvinyl acetate emulsion is employed, polyvinyl alcohol in small amounts, e.g., about 5 to 10 percent by weight of the emulsion can be added to aid in maintaining the polyvinyl acetate in suspension and to enhance the bonding strength of the resin and to confer on the resulting hybrid foam construction superior toughness, particularly in the case of the production of a polymer-inorganic hybrid cement foam according to the invention, without adversely affecting any other advantageous properties of such foam.

The aqueous resin emulsion should contain sufficient water to permit the emulsion to be air whipped in a short period of time into a foam which can be maintained stabilized during the subsequent addition of the inorganic phase particles, the pour time and the initial setting time. For this purpose, for example, the aqueous resin emulsion can contain from about 10 to about 60 percent resin solids by weight, the remainder being water. When desired, water can be added initially to a commercially available resin emulsion to achieve desired dilution of resin or polymer in the aqueous emulsion.

The aqueous resin emulsion is air whipped to establish a pre-foam which preferably has a predetermined or certain volumetric expansion in relation to the volume of the original emulsion. Thus, the initial aqueous resin emulsion can be air whipped from about 1 to about 10 times, usually about 2 to 6 times, its initial volume. Thus, for example, an initial aqueous resin emulsion which has a density of 8.4 pounds/ft.$^3$ and a viscosity of 10 cps. (centipoises) at 25° C. can be whipped to an air entrained foam having a density of about 1 to about 2 pounds/ft.$^3$, in from about 2 to about 10 minutes. This can be accomplished in a device as simple as a Mixmaster equipped with standard beaters or wire whips.

When the initial aqueous resin emulsion has been air whipped to produce the desired volumetric expansion of foam, the inorganic phase in the form of particles of, e.g., portland cement, gypsum, or a mixture thereof, and which is substantially free of sand, rock or aggregate, is gradually added to the aqueous polymer emulsion pre-foam under conditions to maintain the foam stable and without reducing the hybrid foam volume inordinately below the volume of the pre-foam. Ideally the rate of addition of the cement or gypsum to the air whipped pre-foam is such as to maintain the foam volume substantially constant. The preferred flow stream of the inorganic particulate matter is in the form of a thin film, e.g. fed from the edge of a vibrating hopper. Cement particles can be employed in admixture with a minor amount of gypsum, e.g., about 1 to about 25% of the total inorganic, by weight.

If the inorganic particles are added to the pre-foam too rapidly or in too thick a stream, e.g., in the form of lumps, then particles of the inorganic phase tend to precipitate or form on the bottom of the vessel. Of particular significance in the present invention, no gravel or sand is employed. Usually it requires only a few minutes, e.g., about 1 to 2 minutes, to add the cement to the pre-foam. Addition of the inorganic phase particles, e.g., cement or gypsum powder, or a combination thereof, gradually to the air whipped pre-foam as noted above, forms a thin film of such inorganic particles in and/or on the surface of the foam bubbles or cells, and at the intersections between the bubbles, but not in the center of the bubbles, to form a lightweight material. The surface tension and film thickness and strength characteristics of the polymer emulsion when air whipped to bubble form are important factors in the ability of the bubble or cell wall to support a large amount of inorganic powder loading. It has been found from experience that the addition of wetting agents generally decreases the surface tension of the emulsion polymer cell wall, with consequent thinning of the cell wall, and while the initial foam head may be higher upon whipping with air into foam, the resulting foam height and stability of the foam upon addition of the inorganic phase to the system generally is reduced. Further, for example ammonia or simple amines tend to inhibit the crystallization of gypsum systems, causing slow setting, and hence should be avoided in such systems. The gypsum or cement powders appear to act as protective colloids which enhance the stabilization of the bubble structure when suspended within the bubble wall.

It has been found that if the inorganic phase, e.g., cement or gypsum, is added to a resin emulsion such as those noted above, which have not been previously air whipped, the inorganic particles are not suspended in the bubble walls according to the invention concept, but rather tend to nucleate or agglomerate and migrate into the interior of the bubbles formed on mixing following addition of the inorganic phase, and the resultant foam construction following setting does not possess the low density, cell uniformity and high strength characteristics of the hybrid foam construction of the present invention.

It is of interest that most industrial aqueous emulsions are prepared so as to minimize foaming during processing, which proves troublesome, e.g., when vats run over, etc. In some cases minute quantities of silicone anti-foaming agents are added to control this foaming tendency during mixing, pumping, etc. One of the features of this invention is the discovery that nonetheless such emulsion can be successfully emulsified with air by proper beating to form stable pre-foams.

As previously noted, a relatively large amount of inorganic particles can be suspended in the manner noted above in the aqueous resin emulsion. Thus, for example, from about 300 to about 1,000 parts of inorganic particles such as cement or gypsum powder can be supported in an aqueous resin emulsion pre-foam of the types noted above, such as a polyvinyl acetate emulsion, containing about 50 to about 100 parts of resin solids and about 400 to 700 parts of water, by weight. In such aqueous resin emulsions it is noted that hot water may be substituted for cold water, such hot water tending to accelerate the subsequent set of the cement or gypsum. Likewise where extended set times are required for setting, cold or refrigerated water can be used.

It has been found that when employing the preferred polyvinyl acetate aqueous emulsion, such emulsion, for example, will support from 400 to 800 grams cement or gypsum loading of an aqueous resin emulsion containing only 50 parts resin solids and 400 parts water, with relatively little decrease in initial volume in the 400- to 500-gram loading, and less than 50 percent decrease in overall emulsion volume occurs with an 800-gram loading. The higher the inorganic phase loading, generally the greater the density of the resulting foam. It has been found that some systems actually increase in volume with the addition of the inorganic powder, e.g., cement or gypsum, showing that the inorganic particulate matter is truly suspended in the bubble cell walls and not congregating at the interbubble interface or migrating into the center of the bubble, thus increasing the volume of the system.

The resulting pre-foam formed of aqueous resin emulsion having the inorganic particles suspended therein preferably is poured into prepared molds and allowed to set. The initial set time for the pre-foam should be sufficient to form a solid mass which although not fully cured, is self-supporting and which is capable of being removed from the molds. Such initial set time is generally of the order of 10 to about 60 minutes, usually about 20 to 30 minutes. A shorter set time for example of the order of about 10 minutes can be sufficient when a continuous casting process is employed. Thus, the process of the invention, involving rapid setting time is particularly adapted to continuous casting of products, as for example between movable belts.

Since it is generally well recognized that the way to retard the set of gypsum or portland cement is to add a small percentage of organics thereto, it is particularly unexpected and surprising that for example, as much as 100 parts of resin solids can be tolerated in only 600 parts of gypsum or cement and still achieve an initial set according to the invention of say only 10 to 30 minutes.

The molds for the initial setting of the hybrid foam containing the inorganic particles can incorporate plastic or rubber liners. Following the initial set as described above for a period such that the resulting molded parts have a consistency so that such parts are handleable, the parts are removed from the tool or mold, usually with the above-noted plastic or rubber films attached to the parts, and such films can be peeled off either immediately or after a subsequent additional or final curing of the parts.

The period for additional or final setting of the hybrid foam can range, for example, from as little as about 4 hours up to 30 days. If gypsum is employed in the pre-foam, this additional period of setting is essentially a drying operation to remove excess water. When using portland cement, a much slower hydration occurs which at room temperature may take a period of days, e.g., about 15 to about 30 days.

For example, when employing Type V (low sulfate sea waterproof) cement in a polyvinyl acetate aqueous emulsion, this additional setting after demolding can be accomplished according to the following schedule, dependent upon the temperature of setting, with the following hardness values obtained.

| °F. | Cure condition | Set time | Rockwell "R" hardness |
| --- | --- | --- | --- |
| 75 | Moist air | 5 days | 0 |
| 75 | do | 28 days | 60-70 |
| 160 | Dry, no pressure steam | 17 hours | 80-85 |
| 200 | do | 6 hours | 80-100 |

As previously noted, either cement, such as portland cement, alone, or gypsum alone, can be employed as the inorganic phase of the pre-foam resin emulsion. Where gypsum alone is employed, the resulting structural foam produced is not waterproof, whereas when employing portland cement alone, that is gypsum-free cement, the resulting hybrid foam construction is waterproof, and possesses a closed cell structure which is buoyant. Where cement with a small amount of gypsum is employed, such gypsum provides an inhibiting cation in setting of the inorganic phase system. Thus, the preferred cement composition is one which is gypsum-free, permitting greatly accelerated initial sets even in the presence of substantial amounts of organics, e.g., polyvinyl acetate.

As previously noted, the resulting polymer-inorganic hybrid foam produced according to the invention process has substantially lower density than corresponding cement structures produced according to the prior art, and is of a cellular nature yet has good strength and is load supporting, with the additional advantages of being both thermally insulating and fire resistant. Cement hybrid foam articles produced according to the invention floated in water several months without sinking or apparent softening. Gypsum hybrid foams, although softening in water, regain their entire strength upon redrying. However, if a water-repellant gypsum hybrid foam is desired, the outer surface of articles thus produced should be covered with a suitable coating such as a silicone water repellant, and/or any organic film forming protective coating. The density of the polymer-inorganic hybrid foam produced herein can range from about 10 to about 80 pounds/cu. ft., usually about 15 to about 45 pounds/cu. ft., compressive strength of from about 400 to about 2,000 p.s.i. and Rockwell "R" hardness from about 80 to about 125, depending upon the particular organic components employed, the setting schedule and particularly the relative proportions of inorganic to organic components utilized. Such foam is fire resistant and thermally insulating, with a "K factor," e.g., ranging from about 0.15 to about 0.5. The relative proportion or ratio of inorganic components in the final hybrid foam construction can range from about 300 to about 1,000 parts of inorganic, that is cement or gypsum constituents, to about 50 to about 100 parts of resin resin solids, by weight.

Tapered density hybrid foam structures such as panels and beams, e.g., for use in a cantilevered roof, can be made according to the invention by varying the organic-inorganics ratio, e.g., in a continuous process.

Although applicant does not know the nature of the reaction occurring or the relation between the polymer and the inorganic phase, e.g., cement particles, as result of the setting of the hybrid foam, it is believed that a bonding action takes place between the polymer and inorganic phase which in conjunction with the incorporation of the inorganic phase into an air whipped emulsion of the polymer or resin, results in production of both a lightweight and relatively high strength solid foam material, and the polymer particles are substantially uniformly distributed throughout the inorganic phase matrix of the cellular foam structure, the cells of which are highly uniform.

The characteristics of typical polymer-inorganic hybrid foam constructions produced according to the invention employing cement and gypsum, respectively, are as follows:

| Properties | Cement | Gypsum |
| --- | --- | --- |
| Density (lbs./ft.³) | 43.31 | 37.32 |
| Compressive strength (lbs./in.²) | 997 | 792 |
| Modulus | 18.1×10⁵ | 7.5×10⁵ |
| Flexural strength (p.s.i.) | 1,440 | 1,036.4 |
| Resistance to water | (¹) | (²) |
| Chemical resistance | Good | Good |
| Insulating property (K Factor) B.t.u./in | .35 | .28 |
| Rockwell Hardness "R" | 109 | 90 |

¹ Excellent.
² Poor.

The use of fiber glass fabrics and roving have in the past proved unsuitable as reinforcement for concrete or gypsum. When employed in conventional portland or gypsum cement structures, within a few days following setting of the cement, the fiber glass reinforcement loses its strength, as a result of alkaline chemical attack, destroying the surface of the fiber and hence its strength. A relatively heavy vinyl acetate finish on roving has proved somewhat satisfactory in gypsum drywall products but unsatisfactory for portland cement.

An additional feature, according to the invention, is that fiber glass roving can be incorporated or introduced into the polymer-portland cement or polymer-gypsum hybrid foams according to the invention, to form reinforced hybrid foams having excellent strength between both types of hybrid foams and the fiber glass roving, without evidence of degradation of the fiber glass over extended periods when cured at room temperature. There is believed to be an immunizing effect on the fiber glass roving of the resin emulsion-cement or gypsum foam composition of the invention against the alkaline nature of both gypsum and portland cement. Although such mechanism of immunization of the fiber glass against the destructive chemical effects of gypsum or portland cement are not clearly understood, its effect is, however, clearly apparent. Some samples of fiber glass roving reinforced hybrid foams have been stored for periods of months with no evidence of decrease in strength in the foam casting or its fiber glass reinforcement. The present development accordingly permits the use of fiber glass roving reinforcement rather than welded steel mesh, with a specific gravity ratio of 2.6 for the fiber glass roving as against 6.5 for the steel mesh. An additional advantage is that the terminal projections of the fiber glass roving outside the perimeter of a wall, roof or floor structure composed of the polymer-inorganic hybrid foam containing fiber glass roving according to the invention is entirely limp, which simplifies packaging, shipping and handling when compared to stiff, welded wire reinforcements normally employed.

However, where the polymer-cement foams of the invention are cured at elevated temperature, e.g., of the order of about 200° F. in a dry steam atmosphere such curing conditions tend to decompose the fiber glass roving reinforcement. This can be overcome by coating the fiber glass roving with resins and/or asphalt, thereby protecting the fiber glass roving from the harsh alkaline environment during the final cure.

Where fiber glass reinforcement is employed, for example, 20 or 60 end fiber glass roving can be woven into the mold cavity as the preformed reinforcement, e.g., on 1 inch centers in both directions and parallel to both surfaces of the mold and as near such surfaces as practical from the esthetic standpoint. Other synthetic materials such as Dacron, nylon, rayon, and the like, can be employed as reinforcement, in place of fiber glass. Wire mesh either welded or unwelded can also be employed as reinforcement.

Additional advantageous characteristics of the polymer-inorganic foam construction of the invention are as follows. Following coating and curing or setting of such foam construction it has been found that the construction is self-skinning, that is a "smooth skin" is formed on the surfaces, whereas prior art, e.g., air entrained, concrete is not self-skinning. Further, it has been found that shrinkage of the final cured coating is unusually low, for example in a 4" x 4' x 4' hybrid polymer-gypsum foam hollow wall casting, the total final shrinkage was $\frac{1}{32}$" in the 4 ft. length. A plaster coating of similar dimensions shrinks about an inch in such 4 ft. length. Such low shrinkage permits the hybrid foam construction hereof to be cast in the form of panels 40 to 60 ft. long with very low shrinkage and without compensation for shrinkage. In addition, the bubbles formed in the hybrid foam structure, as result of the above described process for producing such foam, function to stop crack formation, and in many cases a local hole can be chopped through a panel without cracking. Also, thermal expansion of the hybrid polymer-inorganic foam is extremely low, e.g., of the order of $1 \times 10^{-8}$ inch/inch/° F. This property largely accounts for the excellent freeze-thaw and thermal shock characteristics of the invention foam construction, and permits large panels of such material to function with no requirement for thermal expansion joints, as is required in present technology.

The main utility of the polymer-inorganic hybrid foam construction materials of the invention is in the construction of wall, floor and roof panels for commercial and residential construction. Other uses include office partitions; fire-barrier doors which are light and easy to handle; polymer-cement ties similar to railroad ties for the support of Arctic pipelines, rail and truck roads and buildings, since the foam material of the invention is inherently buoyant and non-burning and non-rotting; expendable cores for filament wound fiber glass pipes and tanks, which are left in these items; buoyancy materials such as floats, piers and safety buoys; boat and ship hulls; floating airports, beams, trusses and girders for long roof spans; modular precast bridges, cabinets, artificial lumber for shelving, carved panels cast as assemblies, and the like.

The following are examples of practice of the invention, all parts being expressed in terms of parts by weight unless otherwise indicated.

EXAMPLE 1

A resin emulsion was provided by adding to 400 parts water, 75 parts of a 45% aqueous emulsion of polyvinyl acetate, 25 parts of a 45% aqueous emulsion of vinyl acetate-acrylic copolymer and 0.2 part triethanolamine. The resulting aqueous resin emulsion in an open vessel was air whipped by means of a Mixmaster type device equipped with standard beaters to aerate the polymer emulsion formulation noted above, in a manner similar to whipping egg whites.

When the emulsion was whipped to about 5 times the volume of the original emulsion, taking about 2 or 3 minutes, 600 parts by weight of portland cement powder was introduced onto the surface of the pre-foam using an electric vibrator to advance the powder down a chute and allowing it to free-fall onto the surface of the pre-foam while the latter was being vigorously agitated. Addition of the cement powder took place over a period of about 2 minutes.

The resulting hybrid foam mixture having the particles of cement powder suspended therein was poured into a mold or casting cell. In about 10 minutes the consistency of the foam in the mold was sufficiently rigid to be self-supporting, although not hard.

Following such initial set, the article was removed from the mold, and the resulting molded article permitted to set over a period of 28 days at ambient temperature to form the finally cured polymer-inorganic hybrid foam construction material. The cure could be accelerated to about 6 hours by placing the article in a steam bath at 200° F. and ambient pressure. Final drying can be accomplished by oven drying at temperatures from 200–300° F.

The resulting solid foam material had a density of about 37 pounds per cu. ft., was strong and load supporting.

EXAMPLE 2

Test panel #3227 (see Table A)

A prefoam was prepared by air whipping 500 cc. $SRM_4$ (see Table A below) containing an additional 2 cc. triethanol amine for 3½ minutes. The prefoam had an initial volume of 3060 cc. 600 grams of Victor cement was next vibrated onto the surface of the prefoam. After addition of the Victor portland cement to the surface of the prefoam bubbles, the final volume was 1560 cc. The set time was 10 minutes and the resulting density was 30 lbs./cubic ft.

EXAMPLE 3

Test panel #3231 (see Table A)

500 cc. of $SRM_4$ (see Table A below) was placed in a one gallon can and 600 grams of Victor portland cement was summarily dumped into the liquid in a single motion. This non-homogeneous mixture was next stirred to the consistency of a uniform slurry, then air whipped as in the previous Example 2, without first preparing a prefoam. The initial volume of the slurry was 870 cc. A final foam volume of 1200 cc. was achieved after beating for the extended period of 15 minutes. However, the pour continued to lose volume during the setting period by air bubbles breaking at the top surface, leaving large non-homogeneous cells at the upper surface and an imperfect outer skin. By comparison, the pour in Example 2 (panel 3227) remained creamy at the surface and there was no evidence of bubbles bursting or coalescing at the top surface, and the outer skin was perfect.

EXAMPLE 4

Test panel #3232 (see Table A)

A prefoam was prepared according to the invention by air whipping for 3½ minutes 600 cc. of polyvinyl acetate resin emulsion mixture (see Table A below). The prefoam had an initial volume of 3060 cc. 700 grams of gypsum was vibrated onto the surface of the prefoam, requiring about 3½ minutes for this operation. The final volume of the prefoam was 1410 cc. The set time was 15 minutes and no further reduction in volume occurred during setting. The final density was 32.8 lbs./cu. ft. The cell structure was small and uniform and the outer skins were smooth and prefect.

EXAMPLE 5

Test Panel #3233 (see Table A)

A slurry was prepared by stirring 600 cc. of polyvinyl acetate resin emulsion mixture and 700 grams of gypsum. Thereafter the slurry was air whipped for 15 minutes as compared to 3½ minutes in the prefoam method, finally resulting in a volume of 970 cc. Air bubbles of irregular size were present in the skin surface of the foam, and many large bubbles segregated to the top surface of the casting during the 20 minutes set time. The final density was very high, i.e., 53.15 as against the 32.87 for the hybrid foam structure produced according to the invention in Example 4.

The formulations, process conditions, and physical characteristics of the articles produced according to Examples 2 to 5 are set forth in Table A below.

Victor cement is Type 1 portland cement derived from low sulfate rock, and substantially gypsum-free.

Gypsum is 20 minute set Green Label casting plaster.

From the above table it is seen that by practice of the procedure according to the invention as described in Examples 2 and 4 above for producing panels 3227 and 3232, respectively, aeration time for preparation of the resin prefoam was very short, only about 3 minutes, to produce a prefoam volume more than four times the volume of the initial resin emulsion, and following addition of the cement or gypsum to the prefoam, volume of the resulting hybrid foam was still more than twice the volume of the resin emulsion, and after a 10 or 15 minute set time, the cement hybrid foam construction had relatively high compressive strength and hardness with relatively low density and excellent cell uniformity. On the other hand where the cement or gypsum is added first and the resulting non-homogeneous mixture is then stirred and air whipped, according to the procedure of Examples 3 and 5 for producing panels 3231 and 3233, respectively, even after air whipping for 15 minutes as compared to about 3 minutes in Examples 2 and 4, the resulting foam volume of the mixture is substantially less than the corresponding volume of prefoam in Examples 2 and 4 according to the invention principles, and after a set time longer than in Examples 2 and 4, the resulting panels had a substantially higher density than the hybrid foam panels of Examples 2 and 4, together with poor cell uniformity.

EXAMPLE 6

Substantially the procedure of Example 1 was carried out except that 50 parts gypsum was added to the original emulsion prior to air whipping thereof.

The presence of the gypsum in the emulsion tended to inhibit the rate of cure, and the time for initial setting in the mold at ambient temperature was increased to about 12 hours.

TABLE A.—HYBRID FOAM COMPARISON PREFOAM VS. PREMIX FOLLOWED BY FOAMING AERATION

| Panel number | Liquid phase | Solid phase, g. | Aeration time, min. | Prefoam volume, cc. | Hybrid foam volume, cc. | Set time, min. | Rockwell "R" hardness | Compressive strength, p.s.i. | Density, lb./cu. ft. | Cell uniformity |
|---|---|---|---|---|---|---|---|---|---|---|
| 3227 (Ex. 2)[1] | 500 cc. SMR₄, 2cc. TEA | 600 (Victor cement). | 3½ | 3,060 (prefoam). | 1,560 | 10 | 107 | 830 | 30.11 | Excellent. |
| 3231 (Ex. 3)[2] | do | do | 15 | 870 (no prefoam). | 1,200 | 17 | 111 | 600 | 48.67 | Poor. |
| 3232 (Ex. 4)[3] | 400 cc. water, 200 cc. 81-900,* 1 tsp. T-4. | 700 (gypsum). | 3½ | 3,060 | 1,410 | 15 | 92 | 405 | 32.87 | Excellent. |
| 3233 (Ex. 5)[4] | do | do | 15 | 870 (no prefoam). | 970 | 20 | 117 | 1,590 | 53.15 | Poor. |

[1] Prefoam and add particulate matter (portland cement with vibrator).
[2] Low volume aerated after mixing cement and resin emulsion.
[3] Prefoam and add gypsum with vibrator.
[4] Slurry, low volume aerated after mixing gypsum and resin emulsion.

In above Table A, SRM₄ formulation is:

Components— Cc.
Water _____ 8,000
81–900 _____ 1,500
6302 _____ 500
T–1 _____ 20
TEA _____ 4

81–900 is a polyvinyl acetate emulsion containing 55% solids having a particle size of 1 to 3 microns, and a density of 9.2 pounds per gallon.

81–900* is 81–900 containing 5% polyvinyl alcohol by weight.

6302 is a cross-linking acrylic resin emulsion containing 45.5% solids, a particle size of 0.2 micron, and a density of 8.9 to 9.0 pounds per gallon.

TEA is triethanolamine.

T–1 is sodium carboxymethyl cellulose.

T–4 is Methocel in water (10% conc.).

The resulting construction material had substantially the same properties as that produced in Example 1, and although containing a minor portion of gypsum, still had an essentially closed cell structure and was essentially water impermeable.

EXAMPLE 7

The procedure of Example 1 was substantially followed except that the 600 parts of portland cement powder was replaced by 700 parts gypsum powder.

The period for initial set of the air whipped foam containing the suspended gypsum particles was extended to about 60 minutes, and the period for final cure was about 5 days at ambient temperature.

The resulting polymer-inorganic hybrid foam construction had a density of about 35 pounds per cu. ft., and had a fine open cell structure but was not waterproof. This construction material was rendered waterproof by coating the surface of the material with any organic surface coating and/or treatment with a reactive silicone waterproofing agent.

EXAMPLE 8

The following resin emulsion was provided:

| Components— | Weight (grams) |
|---|---|
| Resin A | 81 |
| Resin B | 26 |
| Carboxy methyl cellulose | 0.003 |
| Triethanolamine | 0.2 |
| Water | 400 |

Resin A was a 55% polyvinyl acetate resin emulsion.

Resin B was a 45% cross-linking acrylic resin emulsion.

550 parts of the above resin emulsion mixture was placed in an open tank and the contents of the tank air whipped by a mixer mechanism similar to Example 1 to produce a prefoam having a volume of about 5 times that of the initial resin emulsion.

1,060 parts of Victor cement powder (gypsum-free portland cement) was gradually added to the pre-foam over a period of about 2 minutes, and the resulting foam suspension of resin emulsion having the cement powder suspended in the bubbles of the pre-foam was poured into molds as described substantially in Example 1, and permitted to set therein for a period of about 10 minutes.

Following such an initial setting period, the molded foam constructon in the form of a panel was then removed from the mold and the resulting panel permitted to set for about 28 days at room temperature or an accelerated cure could be performed at 200° F. in a dry steam atmosphere.

The resulting polymer-inorganic hybrid foam panel had a density of 60 lbs./cu. ft., high strength and was load supporting, having a compressive strength of about 1800 p.s.i.

EXAMPLE 9

Substantially the same procedure as Example 8 was carried out except that 600 parts of Victor cement powder was suspended in 500 parts of the air whipped resin emulsion.

The resulting suspension of cement powder in the air whipped resin emulsion was permitted to initially set for a period of 20 minutes prior to demolding.

Following final set for the same period of time as in Example 10 the resulting polymer-inorganic hybrid foam panel had a density of about 30 pounds/cu. ft., and was very strong and tough.

EXAMPLE 10

Panels produced according to Examples 8 and 9 were tested by cycling 12 cycles of freeze-thaw temperatures ranging from −60° F. to 75° F., 24 hours at each extreme per cycle, and on alternate cycles the panels were dipped in water at 75° F. Following such testing procedure, it was observed that no cracks developed in the panels, and a nail could be driven through one inch panels as produced in Examples 5 and 6, one-quarter inch from the edge at −60° F. substantially without formation of cracks at the nail locations, or cracking out to the edges.

EXAMPLE 11

The following formulations for production of an air whipped resin emulsion containing suspended cement particles were provided according to the invention and procedure essentially as described in Example 1 above, except that compressed air was bubbled into the resin emulsion to provide the air whipped prefoam, and the respective formulations subjected to the initial setting times in the molds, as noted in Table B below:

TABLE B

| Air whipped resin emulsions containing cement powder | Compositions (percent) | | | | | | |
|---|---|---|---|---|---|---|---|
| | A | B | C | D | E | F | G |
| Solid 81-900 | 8.9 | 8.0 | 7.2 | 9.45 | 6.9 | 9.4 | 7.6 |
| Solid 6302 | 1.3 | 1.2 | 1.1 | 1.4 | 1.0 | 1.4 | 1.1 |
| TEA | 0.04 | 0.04 | 0.04 | 0.04 | 0.04 | | |
| T-4 | | | | | | 0.011 | 0.011 |
| Water | 47.6 | 42.6 | 38.5 | 50.6 | 36.8 | 50.6 | 40.4 |
| Victor portland cement (low sulfate gypsum-free) | 41.2 | 47.4 | 61.9 | 37.5 | 54.5 | | |
| Gypsum (green label 20 minute set) | | | | | | 37.5 | 50.0 |
| Initial setting time (min.) | 45 | 20 | 15 | 60 | 25 | 25 | 15 |

NOTE.—Solid 81-900, 6302, TEA and T-4 (see Table A above).

Following initial setting of the above respective formulations of Table B, the molded articles in the form of panels were finally set for a period of about 28 days for the cement formulations and 5 days for the gypsum formulations, at room temperature, to form polymer-inorganic foam construction panels according to the invention, having a density ranging from about 10 to about 60 pounds/cu. ft.

EXAMPLE 12

The procedure of Examples 2 and 4 was substantially repeated employing a butadiene-styrene emulsion in place of a polyvinyl acetate emulsion, the formulations, process conditions and results being set forth in Table C below.

TABLE C.—HYBRID FOAM FORMULATIONS USING BUTADIENE-STYRENE EMULSION

| Panel number | Liquid phase | Solid phase, gm. | Aeration time, min. | Foam volume, cc. | Hybrid foam volume, cc. | Initial set time, min. | Rockwell "R" hardness | Compressive strength, p.s.i. | Density, lb./cu. ft. | Cell uniformity |
|---|---|---|---|---|---|---|---|---|---|---|
| 3262 | 400 cc. water, 100 cc. 460, 3 cc. T-1, 2 cc. TEA. | 600 Victor gypsum-free portland cement (Type 1). | 1½ | 2,800 | 1,400 | 17 | 90 | 450 | 38.00 | Excellent. |
| 3263 | 400 cc. water, 100 cc. 6302, 3 cc. T-1, 2 cc. TEA. | 600 Victor portland cement. | 1½ | 2,900 | 1,500 | 23 | 85 | 470 | 27.00 | (¹). |
| 3264 | 400 cc. water, 100 cc. 460, 3 cc. T-4. | 700 gypsum | 1 | 2,800 | 2,000 | 33 | 92 | 500 | 36.00 | Excellent. |
| 3265 | 400 cc. water, 100 cc. 6302, 3 cc. T-4. | do | 1 | 2,900 | 1,700 | 25 | 84 | 400 | 25.5 | Do. |

¹ Fair on surface. Good skin.

NOTE.—460 is Dow Latex 460, a butadiene-styrene emulsion. 6302 is Celanese Corp. 6302, a cross-linking essentially acrylic homopolymer. Victor cement, T-1 and T-4 (see Table A above). TEA (see Table A above).

Note from Table C above the low densities and mostly excellent cell uniformity of the hybrid foam panels produced according to the invention.

EXAMPLE 13

The procedure of Example 4 was substantially followed except employing a silicone emulsion in place of a polyvinyl acetate emulsion. The formulation, process conditions and results are set forth in Table D below.

TABLE D.—SILICONE BASE HYBRID FOAM

| Panel number | Liquid phase | Solid phase, g. | Aeration time, min. | Volume cc. | Foam volume, cc. | Set time, min. | Rockwell "R" hardness | Compressive strength, p.s.i. | Density, lb./cu. ft. | Cell uniformity |
|---|---|---|---|---|---|---|---|---|---|---|
| 3212 | 300 cc. water, 100 cc. silicone emulsion. | 500 gypsum | 13 | 1,700 | 1,200 | 20 | 88 | 617 | 36.09 | Excellent. |

NOTE.—The silicone emulsion was Stauffer Wacker SWS 655.

A 4" x 4" x 1" slab of the hybrid foam produced according to Table D held over a Fisher burner for 48 hours showed only small cracks on the flame side, and another slab held in an electric muffler at 700° F. for 8 hours showed no cracks.

From the foregoing, it is seen that the invention provides novel procedure for producing both portland cement-organic polymer and gypsum-organic polymer hybrid foams of high strength, and which are quick-setting, and have the important properties of low density, high fire resistance and are thermally insulating, and which can be produced particularly at low cost, rendering the construction materials of the invention highly advantageous for production of wall, floor and roof panels, beams and other construction materials, particularly designed for production of low cost buildings and homes.

While I have described particular embodiments of the invention for purposes of illustration, it will be understood that various changes and modifications can be made therein within the spirit of the invention, and the invention accordingly is not to be taken as limited except by the scope of the appended claims.

I claim:

1. The process of producing a cellular polymer-inorganic hybrid foam of low density, and which is load supporting, fire resistant and thermally insulating, which comprises providing an aqueous resin emulsion free of foaming agents and capable of being air whipped to a volumetric expansion as hereinbelow defined, whipping air into said resin emulsion and establishing a pre-foam of resin emulsion bubbles capable of supporting particles of an inorganic phase in the surface of said bubbles, said pre-foam having a volumetric expansion of about 2 to about 10 times the initial volume of said resin emulsion, adding an inorganic phase selected from the group consisting of portland cement and gypsum, said inorganic phase being substantially free of sand, rock or aggregate, in the form of particles gradually to said air whipped resin emulsion and suspending said inorganic particles in the walls of said bubbles without precipitating out said particles, the aqueous hybrid foam following addition of said inorganic phase, containing about 300 to about 1,000 parts of said inorganic particles and about 50 to about 100 parts of resin solids, and hardening said inorganic phase to set the resulting hybrid foam of inorganic particles and resin, and form said polymer-inorganic hybrid foam.

2. The process as defined in claim 1, wherein said resins are selected from the group consisting of thermoplastic and thermosetting resin emulsions.

3. The process as defined in claim 1, employing a resin emulsion wherein the resin is selected from the group consisting of polyvinyl acetate, vinylacrylic copolymer, acrylic homopolymer, butadiene-styrene resins, silicone resins and mixtures thereof, phenol-formaldehyde, urea-formaldehyde and melamine-formaldehyde resins.

4. The processes as defined in claim 3 wherein said inorganic phase is portland cement free of gypsum.

5. The process as defined in claim 3, wherein said inorganic phase is gypsum.

6. The process as defined in claim 3, said inorganic phase being portland cement and about 1 to about 25 percent of gypsum by weight of total inorganics.

7. The process as defined in claim 1, wherein said aqueous resin emulsion is an aqueous polyvinyl acetate emulsion.

8. The process as defined in claim 7, said polyvinyl acetate emulsion containing about 5 to about 10 percent polyvinyl alcohol, by weight of the emulsion.

9. The process as defined in claim 7, said inorganic phase being portland cement free of gypsum.

10. The process as defined in claim 1, including pouring said hybrid foam of aqueous resin emulsion and inorganic phase into a mold and permitting setting of said foam in said mold in the absence of heat until the resulting foam is self-supporting, and removing the set foam from said mold.

11. The process as defined in claim 10, including subjecting the resulting foam to an additional period of setting to form the final hardened cellular hybrid foam.

12. The process as defined in claim 3, said aqueous resin emulsion being air whipped to a volume of about 2 to 6 times its initial volume, the aqueous hybrid foam following addition of said inorganic phase, containing about 400 to about 700 parts water, by weight.

13. The process as defined in claim 12, including pouring said hybrid foam of aqueous resin emulsion and inorganic phase into a mold and permitting initial setting of said foam in said mold for a period of about 10 to about 60 minutes at ambient temperature until the resulting foam is self-supporting, removing said initially set foam from said mold, and subjecting said initially set foam to an additional period of setting of from about 4 hours to about 30 days at temperature ranging from ambient temperature to about 200° F. to form the final hardened cellular hybrid foam.

14. The process as defined in claim 13, said inorganic phase being portland cement free of gypsum.

15. The process as defined in claim 14, wherein said aqueous resin emulsion is an aqueous polyvinyl acetate emulsion.

16. The process as defined in claim 10, including incorporating fiber glass roving in said mold to form a reinforced hybrid foam following setting thereof.

17. The process as defined in claim 13, including incorporating fiber glass roving in said mold prior to pouring the aqueous hybrid foam into said mold to form a reinforced hybrid foam following said additional period of setting, without degradation of said fiber glass during said additional setting period when cured at room temperature.

18. The process as defined in claim 17, said inorganic phase being portland cement free of gypsum and said aqueous resin emulsion being an aqueous polyvinyl acetate emulsion.

19. The process as defined in claim 2, wherein said resin is a synthetic resin.

20. The process as defined in claim 1, said aqueous resin emulsion containing from about 10 to about 60% solids by weight, the remainder being water.

21. The process as defined in claim 1, employing a resin emulsion wherein the resin is selected from the group consisting of polyvinyl acetate, butadiene-styrene resins and silicon resins.

References Cited
UNITED STATES PATENTS

| | | | |
|---|---|---|---|
| 3,138,472 | 6/1964 | Sommer | 106—88 |
| 3,272,765 | 9/1966 | Sefton | 260—2.5 B |
| 3,250,736 | 5/1966 | Gibbs et al. | 260—41 A |

WILBERT J. BRIGGS, SR., Primary Examiner

U.S. Cl. X.R.

106—88, 90, 116, 122; 260—2.5 F; 2.5 HB, 2.5 S, 29.2 M, 29.3, 29.4 R, 29.6 S, 29.7 S, 41 A, 41 AG; 264—50